United States Patent Office 3,350,324
Patented Oct. 31, 1967

3,350,324
POLYMERS DERIVED FROM DODECABORIC ACIDS AND THEIR PREPARATION
Boynton Graham, Wilmington, Del., assignor to E. I. du Pont de Nemours and Company, Wilmington, Del., a corporation of Delaware
No Drawing. Filed July 14, 1964, Ser. No. 382,636
13 Claims. (Cl. 260—2)

This invention relates to polymers obtained from polyhedral borane acids. More specifically, it concerns ionic polymers prepared by the thermal polymerization of dodecaboric acids.

With the discovery of the polyhedral borane anion, $B_{12}H_{12}^=$ and its substitution derivatives [Knoth et al., J. Am. Chem. Soc., 84, 1056 (1962)], interest in preparing polymers containing these boron cage anions in the recurring structural unit of a polymer arose.

The polymers of this invention consist essentially of recurring units of anionic dodecaborate polyhedral cages linked through oxygen to other such cages. The boron atoms of each cage not bonded to linking oxygen are bonded to certain water-stable groups that can bond to carbon of an aromatic ring. The anionic charge on each cage is satisfied by a cation.

The average structural formula of the recurring units of the polymer can be represented as (1) 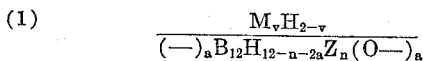

where M is one equivalent of a cation; $v$ is a number from 0 to 1.8; Z is bonded to boron of the dodecaborate anion and represents certain monovalent groups, capable of bonding to carbon on an aromatic ring by replacing hydrogen, and is stable to water; $n$ is a cardinal number of from 0 to 10; (O—) represents the linking oxygen atom and is explained in greater detail below; (—) represents the linking bonds emanating from boron of the boron cage which are linked to oxygens of other boron cages; and $a$ represents the number of linking oxygen atoms and linking bonds present and is a cardinal number of from 1 to 3; $2a+n$ being no greater than 12. When two or more Z groups are present, they can be the same or different.

The initial polymers of this invention may be prepared by heating a polyhedral dodecaborate acid in an open system with provision for removal of gases. Upon treatment of the initially obtained polymers with solvolysis agents, and, if desired cation-exchange agents and reactants that introduce Z groups, the preferred polymers of this invention are obtained.

Initially, polymers of this invention are prepared by heating a dodecaboric acid of the formula (2) $H_2B_{12}H_{12-n'}Z'_{n'} \cdot yH_2O$ wherein Z' is a substituent bonded to boron of the boron cage and can be hydroxyl, carboxyl, halogen (fluorine, chlorine, bromine or iodine), alkyl of up to 12 carbon atoms, alkoxy of up to 12 carbons, alkylthio of up to 12 carbons, and the like; $n'$ is a cardinal number of from 0 to 5; and $y$ is a cardinal number of from 2 to 12 or more. Preferably, Z' is halogen, particularly chlorine, for economic reasons. Because of ease of preparation, especially when Z' is other than halogen, $n'$ is preferably a cardinal number of at most 2. Most preferably, $n'$ is zero.

Exemplary of Z' when it is alkyl, are ethyl, isopentyl, 1-methylbutyl and undecyl; when alkoxy, isobutoxy, pentyloxy, 2-ethylhexyloxy, nonyloxy, and dodecyloxy; and when alkylthio, ethylthio, isopropylthio, hexylthio, 1-methylheptylthio, and decylthio.

The resulting polymer is formed by the breaking of at least two B—H bonds in the boron cage of the monomer, with the ultimate formation of a B—O—B linkage in which each boron atom represents a boron from a different cage.

Thus, the recurring cage unit of the resulting polymer must have at least one of the cage boron atoms attached to a linking oxygen atom and at least one other boroncage atom attached to a linking oxygen atom of an adjoining recurring unit, i.e., a recurring structure represented as —O—$B_{12}$cage—. Since each B—H bond of the cage is a potential reaction site, theoretically each boron cage could be linked, through oxygen, to twelve other boron cages (when $n$ is zero). Practically, each boron cage is linked, through oxygen, to no more than six other boron cages, and the average number is usually about four.

Thus, the formula for the average recurring structural cage unit of the polymers of this invention obtained initially can be written as (3) 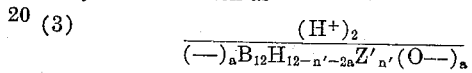

wherein the symbols are as previously defined.

The initial polymers of this invention having the recurring structure of Formula 3 are prepared by heating a monomer of the structure shown in Formula 2 at a temperature of between about 50° to 250° C. The polymerization is accompanied by the evolution of hydrogen and water, and the optimum reaction temperature is one in which the gaseous hydrogen and water are evolved at a convenient rate.

The reaction must be carried out in an open system, for if the gases are not removed, the polymer will hydrolyze as it is formed, resulting in a non-polymeric hydroxylated boron cage compound. The gases may be removed continuously by carrying out the reaction in a vacuum, in a flowing stream of air or nitrogen, or simply in an unrestricted environment such as a hot oven.

Normally, the heating is carried out until the evolution of gases is completed.

The polymer formed is an infusible, insoluble solid. It is ordinarily washed with water, filtered and dried.

The polymers so obtained may be solubilized by a solvolysis process to prepare the preferred polymers of this invention. The solvolysis agents used include water, aqueous solutions of inorganic bases, organic bases (e.g., alkylamines; amides, alkylamides, and dialkylamides of formic acid and lower alkanoic acids; and dialkyl sulfoxides; in which the alkyl groups in all the foregoing organic bases are preferably lower alkyl), and aqueous mineral acids. Examples of solvolysis agents are ammonium hydroxide, sodium hydroxide, potassium hydroxide, barium hydroxide, calcium hydroxide, triethylamine, isopropylamine, dimethylamine, diethylformamide, dimethylacetamide, dipropylacetamide, dimethylpropionamide, and diethyl sulfoxide. The solvolysis step is carried out at temperatures ranging from 50° to 130° C. It is most conveniently performed in an open system at atmospheric pressure, although super- or sub-atmospheric pressures may be employed.

The solvolysis step is believed to affect the insoluble polymers in two ways: Firstly, some of the B—O—B linking bonds are broken, reducing the number of crosslinks. This results in a product in which any one of the boron cages in the polymer is linked, through oxygen, to an average of only two other cages. Secondly, the broken B—O—B linkages form B—OH groups. Thus, the structure of the average recurring unit of the solubilized polymers may be represented by the formula (4) 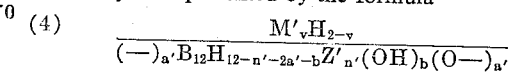

where $Z'$, $(O—)$, $(—)$ and $n'$ are as previously defined; $a'$ represents the number 1; and $b$ represents a cardinal number greater than zero and of at most 4, and $v$ is a number between 0 and 1.8 $2a'+n'+b$ can be no greater than 12. When the solvolysis agent is an inorganic hydroxide or an alkylamine, the cation $M'$ is the cation of the hydroxide or the alkylammonium cation corresponding to the amine; otherwise $M'$ is hydrogen.

In the solvolysis step, the process is conveniently carried out at elevated temperatures, e.g., 50°–150° C. until the insoluble polymer has gone into solution. The now solubilized polymer can be isolated by conventional procedures, e.g., evaporation or precipitation by formation of an insoluble salt. For instance, treatment of the reaction mixture with aqueous tetramethylammonium chloride causes the polymer to precipitate from cold water.

The solubilized polymers represented by Formula 4 may be subjected to cation-exchange treatment, whereby $M'$ may be replaced by any of a wide variety of cations. (Complete neutralization, i.e., with M, is difficult to achieve, as is the case with many other polyelectrolytes.) The nature of the cation is unimportant to this invention (although it can affect properties) and the cation is used to complete the valence charge of each anionic boron cage. The cation may be designated by the symbol M, thus the formula of the polymers of this invention after cation-exchange may be depicted as (5) 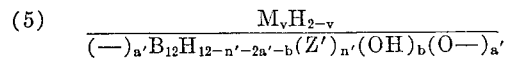

where M is one equivalent of a cation.

From inspection of Formulas 1, 3, 4, and 5, it will be seen that throughout the steps of polymerization, solvolysis, and cation-exchange, each $B_{12}$ cage keeps the double negative charge present in the starting material of Formula 2.

In addition, each $B_{12}$ cage keeps its double negative charge in the process of the introduction of additional Z groups, which process is described in a later section.

M can represent any metal in the Periodic Table shown in Deming's "General Chemistry," fifth edition, page 156 (Wiley, 1944), i.e., a metal of Groups I–A, II–A, III–A, IV–A, V–A, VIA, I–B, II–B, III–B, IV–B, V–B, VI–B, VII–B, or VIII. For example, M can be lithium, potassium, rubidium, cesium, beryllium, magnesium, calcium, barium, strontium, copper, mercury, aluminum, tin, bismuth, silver, zinc, vanadium, chromium, manganese, ruthenium, cobalt, nickel, or any other metal. Preferred metal cations are those having valences of 1, 2, or 3. Especially preferred metals, for reasons of availability, are those of Groups I–A and II–A, i.e., the alkali metals and alkaline-earth metals.

M can also be one equivalent of an organic or organo-inorganic cation, for example, an ammonium, phosphonium, or sulfonium cation of the formula $U_2U'NH^+$, $U_3U'N^+$, $U'_4P^+$, or $U'_3S^+$, where U is aliphatically saturated hydrocarbyl bonded to the nitrogen, phosphorus, or sulfur through aliphatic carbon, $U'$ is aliphatically saturated hydrocarbyl, and any two U and/or $U'$ groups can be joined together, directly or through an oxygen heteroatom, to form an alkylene or oxygen-interrupted alkylene radical. ("Alkylene" as used here refers to a divalent, saturated, aliphatic hydrocarbon radical, e.g., ethylene, —$CH_2CH_2$—.). Because of easier availability, cations in which U and $U'$ contain at most 12 carbons each and any alkylene group contains at most 12 carbons are preferred. Examples are triisopropylammonium, N-methylpiperidinium, N-hexylmorpholinium, pyridinium, trihexylammonium, diethyl-[2-($\beta$-naphthyl)ethyl]-ammonium, N,N-dipropylanilinium, benzyltrimethylammonium, tetraisopentylammonium, didodecyldiethylammonium, butyldimethyl-phenyl)ammonium, 1,1-dimethylhexamethyleniminium, tetrabenzylphosphonium, ethyltriphenylphosphonium, tetramethylphosphonium, isobutylethylmethylpropylphosphonium, ethylpentamethylene-p-tolyphosphonium, tetra($\alpha$-naphthyl)-phosphonium, triphenylsulfonium, methyltetramethylenesulfonium, benzyldodecylmethylsulfonium, methyldipentylsulfonium, and trimethylsulfonium. An especially preferred group of cations of this type are those in which the U and/or $U'$ groups are the same and are lower alkyl, particularly the tetra(lower alkyl)ammonium cations.

As a further example, M can also be any of a very broad class of substituted ammonium or hydrazonium cations represented by the formulas $U'NH_3^+$, $UU'NH_2^+$, $U'N_2H_4^+$, $U'_2N_2H_3^+$, $U'_3N_2H_2^+$, and $UU'_3N_2H^+$, where U and $U'$ are as previously defined. Examples are methylammonium, cyclopropylammonium, 1-methylheptylammonium, 2-(1-naphthyl)-ethylammonium, diisobutylammonium, dicyclohexylammonium, dinonylammonium, morpholinium, dodecamethyleniminium, phenylhydrazonium, 1-methyl-1-phenylhydrazonium, 1-methyl-2-isopropylhydrazonium, dodecylhydrazonium, 1,1,2-triethylhydrazonium, 1,1,1-triheptylhydrazonium, tetramethylhydrazonium, and tetrabenzylhydrazonium.

M can also be hydrogen, ammonium or hydrazonium.

With some cations, including hydrogen, the polymers are frequently isolated as solvates, in which at least some of the solvated molecules may be associated with the cations. Typical donor molecules of this type, i.e., molecules that can associate with these cations, are water, alcohols, ethers, nitriles, carboxamides, and sulfoxides. By far the most common solvate molecule present in the polymers of the present invention is water. In some cases the coordination tendency of the hydrogen ions and of other types of cations is satisfied by donor atoms such as the oxygen of hydroxyl substituents, the oxygen of the B—O—B intercage linkages, or the nitrogen of amino substituents, rather than by solvate molecules. The presence or absence of solvate molecules, and the degree of solvation when such molecules are present, is not critical and is of no particular importance to the present invention. It is to be understood, therefore, that the term "hydrogen," as used here, i.e., as a value of M, includes hydrogen ions solvated with molecules of the types discussed above. This usage of the term "hydrogen" is based on nomenclature approved by the International Union of Pure and Applied Chemistry; see J. Am. Chem. Soc., 82, 5529–30 (1960). More broadly, it is to be understood that the polymers of the invention include solvated polymers generally, and particularly hydrated polymers.

M can also, for example, be a complex cation of any of the metals referred to above, e.g., tetramminecopper (II), tetramminezinc(II), diaquotetramminechromium (III), tris(1,2-propanediamine)chromium(III), nitratopentamminecobalt(III), dichlorobisethylenediaminecobalt (III), dicyclopentadienyliron(III), dibenzenechromium- (I), and tris(acetylacetonato)silicon.

Because of availability and desirable properties of the polymers containing them, the preferred types of cations of those described in the preceding four paragraphs are hydrogen, ammonium, (lower alkyl)ammonium, and di (lower alkyl)ammonium.

Over-all, because of availability, cations having atomic or radical weights of at most about 300, and particularly those having atomic or radical weights of at most about 210, are preferred. Cations that are stable to water also constitute a preferred class, since many of the preparative methods and the procedures conveniently used in working with the polymers involve aqueous systems.

The solubilized polymers may also be treated with substitution reagents to replace any remaining B—H groups with B—Z groups. Thus, the final polymer can be one in which all the cage borons are attached either to linking oxygen bonds or to Z groups.

Z groups can be introduced by conventional processes into the dodecaborate cage of the recurring polymer unit by employing readily available reactants.

Preferably, Z is hydroxyl, halogen (i.e., chlorine, fluorine, bromine or iodine), carboxyl, alkyl of up to 12 carbon atoms, alkoxy of up to 12 carbons, or alkylthio of up to 12 carbons. These Z groups are preferred because the initial boron reactant may contain them.

Hydrogen atoms attached to boron of the $B_{12}$ cages in polymers of Formulas 1, 3, 4, and 5, i.e., in both the primary and secondary (solubilized) polymers, can be replaced by Z groups through reactions of the polymers with electrophilic reagents. Additional values of Z can be realized in the polymers by chemical modification of groups already present (e.g., by reduction, esterification, hydrolysis, or amidation), regardless of the stage at which the group already present was introduced.

Substitution reactions of this type are described in detail for monomeric $B_{12}$ anions in assignee's copending application Ser. No. 246,636, filed Dec. 21, 1962, in the names of Henry C. Miller and Earl L. Muetterties. The general principles and procedures discussed therein apply to the $B_{12}$ anionic units in the polymers of the present invention. In addition, one skilled in the art will appreciate that in general, polymers tend to be less reactive than monomeric compounds having the same structure as the repeating units of the polymers, and therefore somewhat more stringent conditions may be required to effect a given reaction in a polymer of this invention than in a monomeric $B_{12}$ cage compound.

Electrophilic reagents which are broadly operable are given below, together with the substituent group which in the process is bonded to boron in the final product.

| Electrophilic Reagent | Electrophilic Group Bonded to Boron |
|---|---|
| Halogens ($F_2$, $Cl_2$, $Br_2$, $I_2$) | Halogen (F, Cl, Br, I) |
| Cyanogen halides (CNF, CNCl) | Nitrile (CN) |
| Sulfuric Acid | —$SO_3H$ |
| Nitric Acid | —$NO_2$ |
| $H_2NOSO_3H$ | —$NH_2$ |
| Olefins | —alkyl [e.g., —$C_2H_5$, —$CH(CH_3)_2$] |
| Acetylenes | Alkenyl (e.g., —CH=$CH_2$, —CH=CHR″) |
| Acyl Halides |  —R |
| $Hg(OCOCH_3)_2$ | —HgOCOCH_3 |
| $(CN)_2C=C(CN)_2$ | —(CN)C=C(CN)_2 |
| $HNO_2$ | —NO |
| CO/HCl | —CHO |
| $RSO_2Cl$ | —$SO_2$—R |
| $R_2NCOCl$ | —CONR_2 |
| (RORH)+Cl− (oxonium salt) | —OR |
| (ROH_2)+Cl− (oxonium salt) | —OH |
| ($H_2O$)+Cl− (hydronium salt) | —OH |
| RSSR | —SR |

In the above groups, R is a monovalent organic radical, preferably hydrocarbon of at most 18 carbons, which can be alkyl, alkenyl, cycloalkyl, cycloalkenyl, aryl, alkaryl, aralkyl, and the like.

In the reactions employing some of the above electrophilic reagents, a catalyst may be used, e.g., aluminum trichloride, boron trifluoride and polyphosphoric acid. These catalysts are employed in the same manner as in the well-known procedures in organic chemistry. In some cases the boron compounds themselves function as catalysts, e.g., in alkylation of a polymer in which all the cations are hydrogen.

Processes which are employed to introduce one or more Z groups on the boron cages of the polymers are not necessarily identical with the processes employed to introduce the Z groups on a benzene nucleus. Consideration must be given to differences in reactivity or in reaction mechanism between a completely inorganic system, as represented by the anions present in a polymer made from $$H_2B_{12}H_{12}\cdot yH_2O$$

and an organic aromatic system represented by the benzene ring.

It is further noted that in the introduction of Z groups by methods discussed above, the substituent which ultimately is bonded to boron in the final product is not necessarily the substituent which would be obtained with a process employing a conventional carbocyclic aromatic reactant. To illustrate, reaction of formaldehyde with a monomeric dodecahydrododecaborate yields a compound in which Z is —$OCH_3$ instead of —$CH_2OH$ which might be obtained. The same principle applies to polymers containing anionic dodecaborate units. Variations of this nature from conventional results are, as mentioned earlier, not unexpected in view of the completely inorganic character of the $B_{12}$ anionic units.

The following examples illustrate the polymers and processes of the invention:

EXAMPLE I

*Polymerization*

Ten ml. of a 10% aqueous solution of $H_2B_{12}H_{12}$ was dripped onto a glass plate that had been preheated to 200° C. and the residue was held for five minutes at 200° C. The product was a hard clear film. It was scraped off the plate, stirred in 20 parts water at room temperature, filtered and washed with water. The insoluble residue was a rubbery gum with the following analysis:

Found: B, 75.08; H, 7.84; O (diff.), 17.08.

This analysis corresponds to the average composition $B_{12}H_{13.5}O_{1.8}$. The product was a crosslinked polymer in which divalently anionic $B_{12}$ cages (or dodecahedra) were linked together by oxygen atoms. The cations present in conjunction with the anionic boron cages were hydrogen ions. Oxygen in the average recurring unit, in addition to the intercage linking oxygen, can be present as water of hydration and as hydroxyl groups bonded to boron of the boron cage. The polymer was insoluble in ethanol, acetonitrile, concentrated sulfuric acid and chloroform.

*Solvolysis*

The insoluble polymer was solubilized upon treatment with hot dimethylformamide. Evaporation of the dimethylformamide solution for 8 hours on steam bath, followed by treatment for 20 hours at 25° C. and 0.1 mm. vacuum left a soft, clear gum with an inherent viscosity (0.2% in dimethylformamide) of 0.06. The gum was largely soluble in water, ethanol and methanol.

*Cation exchange*

An aqueous solution of the gum was filtered and treated with aqueous tetramethylammonium chloride to give a white precipitate that was partially soluble in hot water. The fraction that was soluble in hot water analyzed for:

Found: B, 54.19; H, 10.22; C, 19.84; O (diff.), 15.75.

This analysis corresponds to the average composition $(CH_3)_4NB_{12}H_{12.5}O_{1.5}$. The product was a polymer in which divalently anionic $B_{12}$ cages were linked together by oxygen atoms, there being an average of one linking oxygen per cage. There was an average of one tetramethylammonium ion and one hydrogen ion present as cations in conjunction with each anionic $B_{12}$ unit. Oxygen in the average recurring unit, in addition to the intercage linking oxygen, can be present as water of hydration and as hydroxyl groups bonded to boron of the boron cage.

EXAMPLE II

*Polymerization*

A 4.48 g. sample of $H_2B_{12}H_{12}\cdot 4.7H_2O$ in a 300-ml. round-bottom flask was evacuated to 0.1 mm. and heated. At about 60° C., water and hydrogen were evolved and the solid foamed copiously. It was held for 2.5 hours at 60° C., heated further to 80° C. during 2 hours and held for 2 more hours at 80° C. The residue was 3.5 g. of a clear colorless solid that dispersed spontaneously and exothermically to fine flakes when water was added. The dispersion was filtered and the solid washed with water and dried for 16 hours/25° C./0.1 mm. vacuum to give 3.60 g. of a brittle white solid (A).

Infrared analysis in Nujol mull disclosed the following absorption bands, for which the tentative assignments in parentheses have been made: 2.8 (—OH), 4.0 (B—H), 4.6, 6.25 ($H_2O$), 9.2 (B—O—B and B—B), 10.6 and 13.9μ (B—B). Analysis showed:

Found: B, 64.67; H, 8.60; O (diff.) 26.73.

This analysis corresponds to the average composition $B_{12}H_{17.3}O_{3.4}$, for a cross-linked polymer having the dodecaborate cages linked by oxygen atoms. The cations present were hydrogen ions. Oxygen in the average recurring unit, in addition to the intercage linking oxygen, can be present as water of hydration and as hydroxyl groups bonded to boron of the boron cage.

Solvolysis

The solid (A) dissolved readily with reaction at 120–125° C. in 10 parts of dimethylformamide. The solution was filtered, evaporated (8 hrs./steam/$N_2$) and dried (3 days/25° C./0.1 mm.) to give 4.40 g. of a viscous yellow resin (B) that was partly soluble in 40 ml. of water.

Cation exchange

The water solution was filtered and treated with 12 ml. of 20% aqueous tetramethylammonium chloride to give 1.97 g. of a white precipitate that was taken up in 90 parts of hot water, filtered and cooled to give a microcrystalline salt (C) that analyzed for:

Found: B, 55.63; H, 10.67; C, 20.94; N, 7.04, 6.82; O (diff.), 5.83. The infrared spectrum (Nujol mull) had absorption bands at 2.8, 4.0, 4.6, 6.0, 6.8, 7.55, 8.8, 9.25, 9.8, 10.6 and 14.9μ. Inherent viscosity (0.5% in dimethylformamide) was 0.02.

The analysis corresponds to an average $B_{12}$-cage recurring unit containing one intercage linking oxygen and combined with one $(CH_3)_4N^+$ ion and one hydrogen ion. Oxygen in the average recurring unit, in addition to the intercage linking oxygen, can be present as water of hydration and as hydroxyl groups bonded to boron of the boron cage.

Properties

A sample of the tetramethylammonium salt C was dissolved in 10 parts of dimethylformamide, filtered, and the filtrate (solution D) spread on glass and on a block of polymethyl methacrylate and dried 4 hours at 60° C. The resultant films were scratch-resistant, glossy, hard, clear and colorless and adhered well. Similar well-adhered coatings were prepared on films of polyethlyene and polyethylene terephthalate, on plaques of steel and aluminum, and on #20 soft copper wire. At thicknesses below about 0.2 mil, the coatings could be sharply creased without cracking.

A similar coating that was modified with an equal weight of glycerol was softer and more flexible.

A glass fiber fabric was impregnated with an equal weight of solution D and dried for 20 hours at 80° C. The resultant product had a fiber/borate resin ratio of 100/10; it was stiff, white and ravel-resistant.

Polyacrylonitrile (one part) was added to ten parts of solution D and the blend was heated and stirred. The polyacrylonitrile dissolved rapidly. The solution was spread on glass and dried 4 hours at 80° C. The resultant film of polyacrylonitrile/borate resin (50/50) was stiff and opaque.

A similar preparation of resin B was taken up in water and treated with an excess of 10% aqueous laurylpyridinium chloride. By this cation-exchange process a yellow precipitate of the laurylpyridinium salt of the polymer formed. It was extracted with chloroform, the chloroform was evaporated, and the residue was dried at 25° C. in a vacuum to give a yellow gum. This was dissolved in dimethylformamide (1 g./5 ml.) to give a fluid yellow solution E. A portion of solution E was spread on glass and dried 16 hours at 80° C. to give a soft, clear film. Another portion of solution E was used to coat coupons of mild steel and aluminum. The coated coupons were dried 6 hours at 80° C. They had better corrosion resistance when tested half immersed in 10% aqueous sodium chloride for seven days, than did control coupons that had been simply treated with dimethylformamide.

Dialysis and cation exchange

In a similar preparation, a sample of the water-soluble fraction of resin B was dissolved in water and dialyzed in uncoated cellophane against running tap water for three days. The porosity characteristics of the cellophane membrane were such that polymeric molecules having molecular weights above about 5000 could not pass through it. The residual solution was treated with an excess of 20% aqueous tetramethylammonium chloride to give about a 50% recovery of a tetramethylammonium salt E analogous to C, but from which all components with molecular weight below about 5000 had been removed by the dialysis. Salt E, cast on glass from solution in dimethylformamide and dried 4 hours at 80° C., gave a well-adhered, hard, colorless film that was somewhat more hazy and somewhat tougher than the similar film obtained from undialyzed salt C as described above. After a similar dialysis of a resin like B, the product was converted to the free acid by ion exchange and then to the sodium salt by neutralizing with 1.0 N sodium hydroxide. The sodium salt had a molecular weight of 5291 as determined by light scattering in water, using the green spectral region. It exhibited fluorescence in the blue region of the spectrum.

EXAMPLE III

Polymerization

A 6.4 g. sample of $H_2B_{12}H_{12} \cdot 4.7H_2O$ was added portionwise during eleven minutes to a nitrogen-swept tube held at 151–160° C. The temperature was held 30 minutes at 150–170° C., then the reaction mixture was washed with water, filtered and dried to give 4.40 g. of a brittle white solid (polymer A) that analyzed for:

Found: B, 54.13; H, 7.17; O (diff.), 38.70.

This corresponds to the average recurring unit $B_{12}H_{17.2}O_{5.8}$, representing a crosslinked polymer in which divalently anionic $B_{12}$ cages are linked together through oxygen and are associated with hydrogen cations, oxygen present in addition to the intercage, linking oxygen being in the form of water of hydration and hydroxyl groups bonded to boron of the boron cages.

Chlorination, solvolysis, cation exchange and dialysis

A 2.0 g. sample of polymer A was suspended in 200 ml. of boiling water and chlorine was bubbled through the refluxing suspension for eight hours. The solid largely dissolved. The soluble fraction was isolated by filtration and evaporation as 3.22 g. of a yellow solid (B) analyzing for:

Found: B, 24.53; H, 3.36; Cl, 50.10; O (diff.) 22.01.

This analysis corresponds to the average recurring unit $B_{12}Cl_{7.5}H_{17.8}O_7$, similar to the srtucture of polymer A except that chlorine has replaced hydrogen on the boron cage and enough B—O—B crosslinks to give a soluble polymer have been broken to leave B—OH entities. There was no B—H absorption at 4.0μ in the infrared showing that all hydrogen had been replaced by chlorine. It also shows that the $B_{12}$ cage is still intact, since non-cage boron hydride compounds do not give hydrolytically stable perhalo derivatives. The yellow solid formed a flocculent cesium salt when treated with aqueous cesium fluoride. The cesium salt was isolated by filtration and twice reprecipitated from hot water by cooling to give a white microcrystalline powder that analyzed for:

Found: B, 17.89; Cs, 33.8; Cl, 36.89; H, 1.08; O, 10.34.

The analysis corresponds to the average recurring unit $Cs_{1.8}B_{12}Cl_{7.5}H_{7.8}O_{4.7}$, $Cs^+$ having replaced 1.8 of the two $H^+$ ions, with a corresponding loss of water of hydration.

A 0.20 g. sample of the yellow solid B was dissolved in water and dialyzed in uncoated cellophane (same porosity as that of Example II) for four days against running tap water. The residual solution was passed through a column of strongly acid ion exchange resin and the eluate was brought to pH=7.00 with 43.9 ml. of N/100 NaOH. This solution was evaporated to give 0.11 g. (55% recovery) of a brown solid, the sodium salt of the high molecular weight fraction (greater than about 5000) of the perchlorinated polymer.

This example demonstrates not only a procedure for preparing a per-substituted boron cage polymer, but also shows that the $B_{12}$ cage units persist throughout the polymerization and the post-halogenation treatments.

Solvolysis and chlorination

A 2.0 g. sample of A was dissolved in 40 ml. of boiling dimethylformamide. The hazy solution was filtered and the filtrate evaporated and dried to give 1.87 g. of a clear, soft resin that analyzed for:

Found: B, 35.16; H, 8.39; C, 23.53; N, 10.23, 10.49; O (diff.) 22.56.

This corresponds to the average recurring unit $B_{12}H_{12}O_{2.5} \cdot 2.7DMF$ in which hydrogen is the cation, the dimethylformamide (DMF) is present as a solvate, there is one intercage linking oxygen, and other oxygen can be present at water of hydration and hydroxyl groups bonded to boron of boron cage.

A 1.37 g. sample of the solvolyzed polymer just described was dissolved in water and treated with chlorine at the boil for six hours. The product was isolated by filtration and evaporation as 2.1 g. of a pale yellow solid that had no B—H band at $4.0\mu$ in the infrared; i.e., all hydrogen bonded to boron had been replaced by chlorine.

By substituting fluorine, bromine, or iodine for chlorine in essentially the foregoing procedure, other polymers of the invention in which the B—H groups have been replaced by the appropriate B-halogen groups can be prepared. Lesser amounts of halogen can be introduced by lowering the amount of halogen, the time, and/or the temperature.

Cation exchange

A solution of the perchlorinated polymer reacted with aqueous cesium fluoride to give a white cesium salt that analyzed for:

Found: Cs, 30.4; B, 16.25; Cl, 36.91, 37.26; H, 1.01; O (diff.), 15.26.

The analysis discloses the average recurring unit to consist of $Cs_{1.8}B_{12}Cl_{8.3}H_8O_{7.6}$, which average unit corresponds to a divalently anionic $B_{12}$ dodecahedron, one intercage oxygen, 8.3 chlorines bonded to boron of the $B_{12}$ cage, and 1.8 cesium cations and 0.2 hydrogen ions in combination with the anionic cage, oxygen present in addition to the intercage oxygen being present as water of hydration and hydroxyl groups bonded to boron of the $B_{12}$ cage.

A sample of resin A was dissolved in hot dimethylformamide to effect solvolysis and filtered. The filtrate was evaporated and the residue taken up in water and filtered. The filtrate was passed through a column of strongly acidic ion exchange resin and the eluate was brought to pH 7.00 with aqueous barium hydroxide. The solution was dried to give a hard, clear, water-soluble resin, which was the barium salt of the solvolyzed polyacid.

EXAMPLE IV

Polymerization, solvolysis, and cation exchange

A 20.0 g. sample of $H_2B_{12}H_{12} \cdot 5.1H_2O$ in a 1-liter flask was evacuated and heated in a steam bath for two hours under vacuum. The acid foamed copiously. The solid residue was washed with water, filtered and dried. It weighed .22 g. It was stirred in 128 ml. of one normal sodium hydroxide. It did not dissolve in 30 minutes at 25° C., but dissolved rapidly and completely when heated to boiling effecting solvolysis and cation exchange. The resulting solution of the sodium salt of the solvolyzed polymer was freed of sodium ion by passing through a column of a strongly acid ion exchange resin ("Rexyn" RG-50(H)). The eluate was evaporated in a vacuum at 40° C. and the residue was dried 18 hours at 25° C. in a vacuum to give 10.0 g. of a soft, clear, spinnable resin A that analyzed for:

Found: B, 57.79; H, 8.87; O (diff.), 33.34, which corresponds to the average recurring unit $B_{12}H_{19.9}O_{4.7}$; which in turn represents a divalently anionic $B_{12}$ cage, in association with two hydrogen ions, linked to two other similar cages through oxygen, the remaining oxygen being potentially present as water of hydroxyl groups bonded to boron of the boron cage, i.e., a polyboron polyacid.

By substituting ammonium hydroxide, propylamine, diethylamine, trimethylamine or tetrapentylammonium hydroxide for sodium hydroxide in essentially the solvolysis procedure described above, solutions of the ammonium, propylammonium, diethylammonium, trimethylammonium, or tetrapentylammonium salts of the solvolyzed polymers are obtained.

A tetramethylammonium salt of resin A was cast from dimethylformamide to give a hard, colorless coating on glass. The salt was prepared by adding excess 20 percent aqueous $(CH_3)_4NCl$ to an aqueous solution of the polymeric acid.

Other salts of resin A; i.e., polymers containing cations other than tetramethylammonium, can be obtained by exactly neutralizing the acid form of the polymer obtained as described above, with a variety of bases and separating the precipitate that forms or evaporating if no precipitate forms. For example, the potassium, calcium, triphenylsulfonium, tetrabenzylphosphonium, hydrozonium, dimethylhydrazonium, and tetramminezinc salts can be made in this manner by neutralizing with potassium hydroxide, calcium hydroxide, triphenylsulfonium hydroxide, tetrabenzylphosphonium hydroxide, hydrazine, dimethylhydrazine, and tetramminezinc hydroxide, respectively.

Cation exchange and dialysis

A sample of resin A was dissolved in water and brought to pH 7.00 by adding N/10 sodium hydroxide and the solution was dialyzed two days in cellophane (same porosity as that of Example II) against running tap water. The residue was passed through a strongly acid ion exchange column, brought to pH 7.00 with N/10 NaOH, evaporated and dried to give a 20% recovery of a polymeric sodium salt (average molecular weight above 5000; same type of recurring unit as described above) that was soluble in ethanol and that could be cast on glass to yield a film that was soft and hazy at 80° C., and deliquescent in ambient air.

A tetramethylammonium salt of the dialyzed polymer, prepared as in the above procedure, was cast from dimethylformamide to give hard, hazy films that were somewhat tougher than those obtained directly from resin A as described above.

EXAMPLE V

Polymerization

A ten-gram sample of $H_2B_{12}H_{12} \cdot 5.3H_2O$ in a 1-liter flask was evacuated to 0.15 mm. and heated 15 minutes in a 150° C. oil bath. The residue was washed with water, filtered and dried. It weighed 7.25 g. and analyzed for:

Found: B, 65.13; H, 7.82; O (diff.), 27.05, which corresponds to the average recurring unit $B_{12}H_{15.7}O_{3.4}$, with the same type of structure as the initial product of Example III.

Solvolysis

The polymer was dissolved in dimethylformamide at 120° C., filtered and evaporated to give 8.8 g. of a pale yellow resin that analyzed as:

Found: B, 44.52; C, 23.36; H, 9.02; N, 9.51, 9.47; O (diff.), 13.61, which corresponds to the recurring unit $B_{12}H_{12.3}O_{0.5}$, with the same type of structure as the initial product described in Example III in the section headed "Solvolysis and Chlorination."

Cation exchange

The solvolyzed polymer was dissolved in water, an insoluble fraction was removed by filtration, the filtrate was passed through a strongly acid ion exchange column ("Rexyn" RG–50 (H)), and the eluate was evaporated to give 3.3 grams of a clear, brittle resin with a neutral equivalent of 115. This is the free acid form of the polyborate polymer described above. It was dissolved in water to give an opalescent solution at 8.4% concentration (solution A).

Fabrics of nylon, polyethylene terephthalate, polyacrylonitrile, and polyhydroxypivalic acid were impregnated with solution A, dried 15 minutes at 25° C., and heated 5 minutes at 195° C. All fabrics were stiffened and all but the nylon were greatly improved in static dissipation. The static dissipiation was not removed by rinsing for two hours in hot running water. The rinsing greatly decreased the stiffness of the fabrics. All of the treated fabrics had improved receptivity for basic dyes.

A portion of solution A was diluted to 1.0% concentration. 0.1 part, based on the polymer acid, of a sodium lauryl sulfate wetting agent was added, and the solution was used to wet a 5-mil film of polyethylene terephthalate. The treated film was dried 15 minutes at 90° C. and then laminated to a 6-mil film of low density polyethylene, pressing for 5 minutes at 200° C. under a pressure of 300 lbs./sq. in. The laminate was well adhered. When an attempt was made to separate it, the polyethylene layer failed by tearing at a peeling force of about 1200 g./in. In contrast, a similar laminate made without use of the borate polymer acid could be readily separated at a peeling force of 300–400 g./in.

EXAMPLE VI

Polymerization

A 10% aqueous solution of $H_2B_{12}H_{12}$ in a 500-ml. flask was immersed in an 80° C. bath and opened to vacuum. Water evaporated smoothly. After 40 minutes, vigorous foaming occurred. Foaming continued for 3.5 hours. After 6 hours, the residue was washed with water and dried to give 3.47 g. of a white polymer having the same type of recurring unit as the initial product of Example II.

Solvolysis

A 1.0 g. sample of the polymer dissolved in 10 ml. of dimethyl sulfoxide at 100° C. to give a clear fluid solution A.

A portion of solution A was spread on glass and dried 4 hours/100° C. The residue was a hard, clear, colorless film.

Another portion of solution A was evaporated under nitrogen on a steam bath and the residue was dried 20 hours/25° C./vacuum. The soft, clear, colorless, water-soluble residue analyzed for:

Found: B, 33.37; H, 7.66; C, 18.46; S, 25.24; O (diff.), 15.27.

This corresponds to an average recurring unit of the same type as that present in the initial product described in Example III in the section headed "Solvolysis and Chlorination," except that dimethyl sulfoxide was present as a solvating molecule in place of dimethylformamide.

Cation exchange

A tetramethylammonium salt, prepared by reaction with tetramethylammonium chloride in water, was a white solid. It was dissolved in dimethylformamide and the solution was spread on glass, polymethyl methacrylate, and polyethylene film. Well-adhered coatings were obtained.

EXAMPLES VII–XIX

Examples of the polymerization of substituted derivatives of $H_2B_{12}H_{12} \cdot XH_2O$ to obtain polymers of this invention are shown in accompanying Table I. In all cases, acids of the indicated composition were heated under vacuum until gas evolution was complete. Water-insoluble products were solubilized by treatment with dimethylformamide and the degree of polymerization was examined by dialysis experiments as in Examples III and IV. Tetramethylammonium salts were prepared and cast as films on glass from solution in dimethylformamide. In cases where the degree of substitution is not a whole number, the composition may be taken to comprise a mixture of the average composition indicated. Such mixtures polymerized without significant change in degree of substitution; even the high polymeric fractions isolated by dialysis had the same degree of substitution as the starting materials.

TABLE I.—HEATING SUBSTITUTED $H_2B_{12}H_{12}$ DERIVATIVES

| Example | Compound | Heating Cycle | Properties of the Product | | |
|---|---|---|---|---|---|
| | | | Percent Sol. in $H_2O$ | Percent Not Dialyzable | Film Properties |
| VII | $H_2B_{12}H_{11}OH \cdot 5H_2O$ | 6 hrs./80° C | 34 | 60 | Hard, hazy. |
| VIII | $H_2B_{12}H_{11}COOH \cdot XH_2O$ | 6 hrs./80° C | 100 | 45 | Hard, clear. |
| IX | $H_2B_{12}H_{10.7}Br_{1.3} \cdot XH_2O$ | 4 hrs./80° C | 13 | 21 | Do. |
| X | $H_2B_{12}H_{10}I_2 \cdot 6H_2O$ | 3 hrs./80° C | 100 | | Hard, hazy. |
| XI | $H_2B_{12}H_{9.5}Br_{2.5} \cdot 7H_2O$ | 4 hrs./80° C | 95–100 | | Do. |
| XII | $H_2B_{12}H_9Br_3 \cdot 12H_2O$ | 7 hrs./85° C | 99 | 57 | Hard, clear. |
| XIII | $H_2B_{12}H_{8.1}Br_{3.9} \cdot 5.3H_2O$ | 90 min./125–130° C | 100 | 10 | Do. |
| XIV | $H_2B_{12}H_8(OH)_4 \cdot 3H_2O$ | 5 hrs./175° C | 27 | 14 | |
| XV | $H_2B_{12}H_8F_4 \cdot 5H_2O$ | 1 hr./140° C | 100 | 14 | Hard, hazy. |
| XVI | $H_2B_{12}H_{7.1}Br_{4.9} \cdot 6.3H_2O$ | 2 hrs./155° C | 100 | 20 | Hard, clear. |
| XVII | $H_2B_{12}H_7F_5 \cdot 3H_2O$ | 1 hr./160° C | 100 | 14 | |

As is evident from the foregoing examples, a wide variety of acid monomers may be employed. Other representative monomers include hydrates of $H_2B_{12}H_{10}(OH)_2$
$H_2B_{12}H_{10}(COOH)_2$
$H_2B_{12}H_8Cl_4$
$H_2B_{12}H_{10}(CH_3)_2$
$H_2B_{12}H_{10}(OC_3H_7)_2$
$H_2B_{12}H_{11}SC_8H_{17}$
$H_2B_{12}H_9(OH)_2OCH_3$
$H_2B_{12}H_8(SCH_3)_2(COOH)_2$
$H_2B_{12}H_8(OH)_4$
$H_2B_{12}H_{11}F$
$H_2B_{12}H_{10}(C_6H_{13})_2$
$H_2B_{12}H_{11}OCH(C_2H_5)_2$
$H_2B_{12}H_{10}(OC_8H_{17})_2$
$H_2B_{12}H_8(SCH_3)_2(OC_2H_5)_2$ $H_2B_{12}H_7I_3(COOH)_2$
$H_2B_{12}H_8(C_2H_5)_2(OH)_2$
$H_2B_{12}H_{11}Cl$
$H_2B_{12}H_{10}[CH(CH_3)_2]_2$
$H_2B_{12}H_{11}C(CH_3)_3$
$H_2B_{12}H_{11}C_{12}H_{25}$
$H_2B_{12}H_{11}SC_{11}H_{23}$
$H_2B_{12}H_{11}SC_{11}H_{23}$
$H_2B_{12}H_{10}(OC_{10}H_{21})_2$
$H_2B_{12}H_9Cl_2COOH$
$H_2B_{12}H_{10}BrC_2H_5$ and the like.

The $H_2B_{12}H_{12} \cdot yH_2O$ acid monomers may be prepared by subjecting the $B_{12}H_{12}^=$ salt described by H. C. Miller, et al. in Jour. Am. Chem. Soc., 85, 3385 (1963) to an acidic cation-exchanger resin.

The substituted dodecaboric acids in which Z is halogen can be prepared by the methods described by W. H. Knoth et al. in Inorganic Chemistry, 3, 159 (1964).

By reacting $H_2B_{12}H_{12}$ hydrate with carbon monoxide at 60°–150° C. and 500–1000 atmospheres, $B_{12}H_{10}(CO)_2$ and $B_{12}H_{11}CO^-$ are obtained. These compounds can then be treated with water or aqueous hydroxide to obtain the monomeric reactants herein where Z is —COOH.

Monomers wherein Z is hydroxyl can be prepared by treating $(NH_4)_2B_{12}H_{12}$ with N-methylpyrrolidone in concentrated HCl at 170° C. The product of this reaction is then treated with NaOH to obtain the sodium salts of the hydroxylated dodecarborate cage. By acidic ion-exchange the sodium salt can be converted to the acid form. More highly hydroxylated $B_{12}$ anions can be obtained by heating hydrates of aluminum or beryllium salts of $H_2B_{12}H_{12}$ under reduced pressure or by irradiating the corresponding polybromo-substituted $B_{12}$ anions in the presence of water.

Alkyl groups, —R, can be introduced into the $B_{12}H_{12}^=$ ion by reacting a hydrate of $H_2B_{12}H_{12}$ with the corresponding olefins at about 0–80° C. The boron-containing acid is strong enough to catalyze this alkylation process in the absence of any other catalyst.

Alkoxy groups, —OR, can be introduced into the $B_{12}H_{12}^=$ ion by reacting a hydrate of $H_2B_{12}H_{12}$ with the corresponding methyl ether, $CH_3OR$, at about 50–100° C.

Alkylthio groups, —SR, can be introduced into the $B_{12}H_{12}^=$ ion by reacting a hydrate of $H_2B_{12}H_{12}$ with the corresponding disulfides, RSSR, at ordinary temperatures.

All the foregoing processes for introducing Z groups into the $B_{12}H_{12}^=$ ion are described in detail in application S.N. 246,636, referred to previously.

As described in the examples, the solubilized polymers find utility as films for use in applications involving polymeric films, as protective coatings, fabric stiffeners, adhesives, antistats, and dyeing aids. The unsolubilized polymers find utility, as shown in the examples, in preparing the solubilized polymers. In addition, they may be employed as acidic cation-exchange resins.

Inert materials such as dyes, pigments, fillers, delusterants, plasticizers and antioxidants can be incorporated in the polymers. Polymers containing such additives are included in the products of the invention.

As many apparently widely different embodiments of this invention may be made without departing from the spirit and scope thereof, it is to be understood that this invention is not limited to the specific embodiment thereof.

The embodiments of the invention in which an exclusive property or privilege is claimed are defined as follows:

1. An ionic boron-containing polymer consisting essentially of recurring structural units of the formula

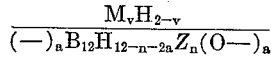

wherein (1) the moiety above the solid line represents the cationic portion in which H is hydrogen, M is one equivalent of a cation of valence 1 to 3, inclusive, and v is a number of from 0 to 1.8, inclusive;

(2) the moiety below the solid line represents the anionic portion in which $B_{12}H_{12-n-2a}$ represents a boron skeleton of a polyhedral dodecaborate cage with $(12-n2a)$ hydrogens attached;

Z represents a substituent bonded to boron by replacement of hydrogen and is selected from the class consisting of hydroxyl, halogen, carboxyl, alkyl of up to 12 carbon atoms, alkoxy of up to 12 carbon atoms, and alkylthio of up to 12 carbon atoms;

n represents the number of Z groups bonded to boron and is a cardinal number of 0 to 10 inclusive;

(—) represents a linking bond of the polymer chain emanating from boron;

(O—) represents oxygen bonded to boron and the linking bond of the polymer chain emanating therefrom;

a represents the number of (—) and (O—) entities present and is a cardinal number of 1 to 3 inclusive; and $2a+n$ is at most 12.

2. The polymer of claim 1 wherein M is hydrogen and v is 1.

3. The polymer of claim 2 wherein n is 0 to 5, inclusive.

4. The polymer of claim 1 wherein M is tetraloweralkylammonium.

5. The polymer of claim 1 wherein a is 2.

6. The polymer of claim 1 wherein a is 1.

7. The polymer of claim 6 wherein n is at least 1 and wherein at least one Z is hydroxyl.

8. The polymer of claim 7 wherein all the Z groups are hydroxyl.

9. The polymer of claim 1 wherein n is at least 2 and Z is selected from the class consisting of chlorine, hydroxyl, and combinations thereof.

10. The polymer of claim 1 in the form of a film.

11. A process for preparing an ionic polydodecaborate polymer which comprises heating in an open system at a temperature of from about 50° to 250° C., a polyhedral dodecaboric acid of the formula $H_2B_{12}H_{12-n}\cdot Z'_n \cdot yH_2O$ wherein Z' is selected from the class consisting of hydroxyl, carboxyl, halogen, alkyl of up to 12 carbon atoms, alkoxy of up to 12 carbon atoms, and alkylthio of up to 12 carbon atoms; n' is a cardinal number of from 0 through 5; and y is a cardinal number of from 2 through 12, until gaseous evolution is completed.

12. A process for preparing an anionic polydodecaborate polymer which comprises treating at a temperature of from about 50° to 130° C., a polymer consisting of recurring units of the formula

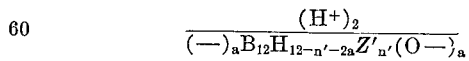

wherein Z' is a substituent selected from the class consisting of hydroxyl, halogen, carboxyl, alkyl of up to 12 carbon atoms, alkoxy of up to 12 carbon atoms, and alkylthio of up to 12 carbon atoms; n' is a cardinal number of from 0 through 5, a is a cardinal number of from 1 through 3, and (—) and (O—) are defined as in claim 1 with a solubilizing agent selected from the group consisting of water; aqueous solutions of inorganic hydroxides; lower alkylamines; amides, alkylamides and dialkylamides of formic acid and lower alkanoic acids; dialkyl sulfoxides; and aqueous mineral acids.

13. A process for preparing an ionic polydodecaborate polymer which comprises heating in an open system at a temperature of from about 50° to 250° C., a polyhedral dodecaboric acid of the formula $H_2B_{12}H_{12-n'}Z'_{n'} \cdot yH_2O$ wherein $Z'$ is selected from the class consisting of hydroxyl, carboxyl, halogen, alkyl of up to 12 carbon atoms, alkoxy of up to 12 carbon atoms, and alkylthio of up to 12 carbon atoms; $n'$ is a cardinal number of from 0 through 5; and $y$ is a cardinal number of from 2 through 12, until gaseous evolution is completed; and treating the resulting polymer at a temperature of from about 50° to 130° C. with a solubilizing agent selected from the group consisting of water; aqueous solutions of inorganic hydroxides; lower alkylamines; amides, alkylamides and dialkylamides of formic acid and lower alkanoic acids; dialkyl sulfoxides; and aqueous mineral acids.

References Cited

UNITED STATES PATENTS

| | | | |
|---|---|---|---|
| 3,166,378 | 1/1965 | Knoth | 260—514 |
| 3,169,045 | 2/1965 | Miller et al. | 260—606.5 |
| 3,189,580 | 6/1965 | Dawes | 260—2.2 |
| 3,258,479 | 6/1966 | Alexander et al. | 260—75 |

WILLIAM H. SHORT, *Primary Examiner.*

C. A. WENDEL, M. GOLDSTEIN, *Assistant Examiners.*

PO-1050
(5/69)

UNITED STATES PATENT OFFICE
CERTIFICATE OF CORRECTION

Patent No. 3,350,324      Dated October 31, 1967

Inventor(s) BOYNTON GRAHAM

It is certified that error appears in the above-identified patent and that said Letters Patent are hereby corrected as shown below:

Column 7, line 51, "polyethlyene" should be -- polyethylene --.

Column 8, line 61, "srtucture" should be -- structure --.

Column 10, lines 37 to 38, "hydrozonium" should be -- hydrazonium --.

Column 13, line 7, that portion of the formula reading "$-SC_{11}H_{23}$" should read -- $-SC_4H_9$ --; line 15, "$B_{12}H_{12}{=}$" should be -- $B_{12}H_{12}^{=}$ --.

Column 14, line 8, "12-n2a" should read -- 12-n-2a --

SIGNED AND
SEALED
DEC 8 1970

(SEAL)
Attest:

Edward M. Fletcher, Jr.
Attesting Officer

WILLIAM E. SCHUYLER, JR.
Commissioner of Patents